United States Patent
Lu et al.

(10) Patent No.: US 11,462,490 B2
(45) Date of Patent: Oct. 4, 2022

(54) SECURITY CHIP, SECURITY CHIP PRODUCTION METHOD AND ELECTRONIC DEVICE

(71) Applicant: SHENZHEN GOODIX TECHNOLOGY CO., LTD., Shenzhen (CN)

(72) Inventors: Bin Lu, Shenzhen (CN); Jian Shen, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/026,213

(22) Filed: Sep. 19, 2020

(65) Prior Publication Data

US 2021/0043587 A1     Feb. 11, 2021

Related U.S. Application Data

(63) Continuation of application No. PCT/CN2019/099855, filed on Aug. 8, 2019.

(51) Int. Cl.
 H01L 23/00 (2006.01)
 H01L 21/48 (2006.01)
 (Continued)

(52) U.S. Cl.
 CPC .......... H01L 23/573 (2013.01); H01L 21/481 (2013.01); H01L 23/12 (2013.01); H01L 23/552 (2013.01)

(58) Field of Classification Search
 CPC .................................................... H01L 23/573
 (Continued)

(56) References Cited

U.S. PATENT DOCUMENTS 6,060,773 A   5/2000 Ban et al.
8,138,566 B1  3/2012 Leydier et al.
(Continued)

FOREIGN PATENT DOCUMENTS

CN       1323448 A    11/2001
CN     101809498 A     8/2010
(Continued)

OTHER PUBLICATIONS

Yun Zhang: "Study on Key Technique of Anti-Physical-Attack Security Chip," dissertation of Master degree, Tianjin University, Dec. 8, 2015, 68 pages.

*Primary Examiner* — Ajay Arora (57) ABSTRACT

A security chip includes: a first medium layer; a second medium layer disposed on the first medium layer, where the first medium layer is an optically denser medium relative to the second medium layer, and a roughness of an upper surface of the first medium layer is greater than or equal to a preset threshold, so that light entering the second medium layer from the first medium layer is able to be totally reflected and/or scattered; and a semiconductor chip disposed on the second medium layer. Based on the above technical solution, light incident from a lower surface of the first medium layer is able to be totally reflected or scattered by the upper surface of the first medium layer, so that most of light cannot reach a logic or storage area on the front of the security chip, thereby achieving the purpose of resisting a laser attack.

19 Claims, 4 Drawing Sheets

(51) Int. Cl.
*H01L 23/552* (2006.01)
*H01L 23/12* (2006.01)

(58) Field of Classification Search
USPC .......................................................... 257/777
See application file for complete search history.

(56) References Cited

U.S. PATENT DOCUMENTS

| | | |
|---|---|---|
| 8,534,849 B2 | 9/2013 | Coggio et al. |
| 9,551,816 B2 | 1/2017 | Coggio et al. |
| 2001/0053573 A1* | 12/2001 | Lee .................. H01L 21/31625 |
| | | 438/200 |
| 2010/0129746 A1 | 5/2010 | Jung |
| 2010/0195201 A1 | 8/2010 | Minoura et al. |
| 2010/0265584 A1 | 10/2010 | Coggio et al. |
| 2016/0202398 A1 | 7/2016 | Coggio et al. |

FOREIGN PATENT DOCUMENTS

| | | |
|---|---|---|
| CN | 102458819 A | 5/2012 |
| CN | 103837915 A | 6/2014 |
| CN | 104376357 A | 2/2015 |
| CN | 106326053 A | 1/2017 |
| CN | 109863509 A | 6/2019 |
| EP | 0884778 A2 | 12/1998 |
| JP | 2007194566 A | 8/2007 |
| JP | 2016062031 A | 4/2016 |
| JP | 2017062299 A | 3/2017 |

\* cited by examiner

S31 — Forming a second dielectric layer on an upper surface of a first dielectric layer, where the first dielectric layer is an optically denser medium relative to the second dielectric layer, and a roughness of the upper surface of the first dielectric layer is greater than or equal to a preset threshold, so that a light ray entering the second dielectric layer from the first dielectric layer is able to be totally reflected and/or scattered S32 — Producing a chip on the second dielectric layer

SECURITY CHIP, SECURITY CHIP PRODUCTION METHOD AND ELECTRONIC DEVICE

CROSS-REFERENCE TO RELATED APPLICATIONS

This application is a continuation of International Application No. PCT/CN2019/099855, filed on Aug. 8, 2019, the disclosure of which is hereby incorporated by reference in its entirety.

TECHNICAL FIELD

Embodiments of the present disclosure relate to the field of security chips, and more particularly, to a security chip, a security chip production method and an electronic device.

BACKGROUND

A security chip is a special chip that can execute complex encryption and decryption algorithms.

A secret key is stored in a special storage area of the security chip, and an attacker usually obtains the secret key by means of bypass attack, fault injection, and hardware Trojan horse.

Laser fault injection is a very threatening attack method. Because there is a metal layer on the front of the security chip, it has a reflection effect on a laser. An attacker usually uses an infrared laser to illuminate a specific circuit on the front of the chip through the back of the security chip, and uses photocurrent generated by interaction between the laser and silicon to make the security chip output wrong results. Finally, the attacker can obtain the secret key by collecting errors with certain characteristics that occur at a specific time and at a specific location, and performing comparison and analysis with correct encryption results.

In related technologies, a photosensitive module is usually provided in a security chip. When the photosensitive module detects a laser, an instruction command is issued to instruct erasure of a secret key stored in the security chip. However, the photosensitive module needs to occupy an additional chip area, which increases chip costs.

Therefore, in a case that an additional chip area is not occupied, how to prevent a laser attack is an urgent technical problem to be solved in the art.

SUMMARY

Provided are a security chip, a security chip production method and an electronic device, which can ensure that a laser attack is prevented in a case that an additional chip area is not occupied.

In a first aspect, provided is a security chip, including:
a first medium layer;
a second medium layer disposed on the first medium layer, where the first medium layer is an optically denser medium relative to the second medium layer, and a roughness of an upper surface of the first medium layer is greater than or equal to a preset threshold, so that light entering the second medium layer from the first medium layer is able to be totally reflected and/or scattered; and
a semiconductor chip disposed on the second medium layer.

Regarding vertical light incident in a vertical direction with respect to a lower surface of the first medium layer, when the roughness of the upper surface of the first medium layer is greater than or equal to the preset threshold, the vertical light can reach an interface between the first medium layer and the second medium layer, which increases its angle of incidence so that the angle of incidence is greater than a critical angle to meet conditions for total reflection; and the vertical light entering the first medium layer through total reflection can effectively reduce intensity of refracted light entering the second medium layer, so that most of the light cannot reach a logic or storage area on the front of the security chip, thereby achieving the purpose of resisting a laser attack.

Regarding oblique light incident in an oblique direction with respect to the lower surface of the first medium layer, when the roughness of the upper surface of the first medium layer is greater than or equal to the preset threshold, light receiving area of the second medium layer for the oblique light can be reduced, which further reduces the amount of refracted light entering the second medium layer, thereby achieving the purpose of resisting a laser attack. In addition, compared with a propagation path of the vertical light in the first medium layer, a propagation path of the oblique light in the first medium layer is longer, which further increases the loss in the process that the oblique light reaches the first medium layer and the second medium layer, and further reduces intensity of the light entering the second medium layer.

In addition, regardless of whether the interface between the first medium layer and the second medium layer is perpendicular or not perpendicular to incident light, the upper surface of the first medium layer whose roughness is greater than the preset threshold can scatter the light, so that a laser cannot be concentrated to a specific area, thereby further reducing intensity of refracted light entering the second medium layer.

In summary, light incident from the lower surface of the first medium layer is able to be totally reflected or scattered by the upper surface of the first medium layer, thereby reducing intensity of light reaching the logic or storage area on the front of the security chip, thereby achieving the purpose of resisting a laser attack.

In addition, by producing the semiconductor chip on a substrate formed by the first medium layer and the second medium layer, not only a laser attack can be ensured to be prevented in a case that an additional chip area is not occupied, but also a process flow is relatively simple and does not affect a processing method of the chip, which is convenient for mass production.

In some possible embodiments, the preset threshold is 20 nm.

In some possible embodiments, the upper surface of the first medium layer is provided with a spike-like structure or a hole-like structure.

In some possible embodiments, the spike-like structure is formed by an irregularly-sized pyramidal protrusion or inverted pyramidal pit.

In some possible embodiments, an oblique surface of the pyramidal protrusion and a bottom surface of the first medium layer form an angle of 54.7 degrees.

In some possible embodiments, a material of the first medium layer is silicon (Si), and a material of the second medium layer is silicon dioxide ($SiO_2$).

An angled $Si/SiO_2$ interface is formed inside the substrate. When light is transmitted from the back of the security chip to the front of the security chip in a vertical direction, the incident light is totally reflected at the $Si/SiO_2$ interface, so that most of the laser cannot reach the logic or storage area on the front of the security chip, thereby achieving the purpose of resisting a laser attack.

In some possible embodiments, the semiconductor chip includes:

a substrate disposed on the second medium layer:

a device layer disposed on an upper surface of the substrate; and an interconnection layer disposed on the device layer.

In a second aspect, provided is an electronic device, including the security chip in the first aspect and any possible embodiment of the first aspect.

In a third aspect, provided is a method for producing a security chip, including:

forming a second medium layer on an upper surface of a first medium layer, where the first medium layer is an optically denser medium relative to the second medium layer, and a roughness of the upper surface of the first medium layer is greater than or equal to a preset threshold, so that light entering the second medium layer from the first medium layer is able to be totally reflected and/or scattered; and producing a semiconductor chip on the second medium layer.

In some possible embodiments, the preset threshold is 20 nm.

In some possible embodiments, before the forming the second medium layer on the upper surface of the first medium layer, the method further includes:

forming the upper surface of the first medium layer that is provided with a spike-like structure or a hole-like structure.

In some possible embodiments, the spike-like structure is formed by an irregularly-sized pyramidal protrusion or pyramidal pit.

In some possible embodiments, an oblique surface of the pyramidal protrusion and a bottom surface of the first medium layer form an angle of 54.7 degrees.

In some possible embodiments, the forming the upper surface of the first medium layer that is provided with the spike-like structure or the hole-like structure includes:

forming the upper surface of the first medium layer that is provided with the spike-like structure or the hole-like structure by at least one of the following processes:

a physical mechanical grinding process, a dry etching process, a metal assisted corrosion process, or an electrochemical corrosion process.

In some possible embodiments, the forming the upper surface of the first medium layer that is provided with the spike-like structure or the hole-like structure includes:

placing the first medium layer in a corrosive agent; and heating the corrosive agent to form the upper surface of the first medium layer that is provided with the spike-like structure or the hole-like structure.

In some possible embodiments, the corrosive agent includes at least one of the following:

a sodium hydroxide (NaOH) solution, a potassium hydroxide (KOH) solution, a tetramethylammonium hydroxide (TMAH) solution, or a sodium silicate ($Na_2SiO_3$) solution.

In some possible embodiments, the heating the corrosive agent includes:

heating the corrosive agent to a temperature above 80° C. and performing corrosion for more than 25 minutes.

In some possible embodiments, a concentration of the corrosive agent is greater than or equal to 8 wt %.

In some possible embodiments, the forming the second medium layer on the upper surface of the first medium layer includes:

forming the second medium layer on the upper surface of the first medium layer by a deposition process.

In some possible embodiments, before the producing the semiconductor chip on the second medium layer, the method further includes:

forming a flat upper surface of the second medium layer by a planarization process.

In some possible embodiments, the producing the semiconductor chip on the second medium layer includes:

bonding a substrate on the second medium layer;

producing a device layer on the substrate; and producing an interconnection layer on the device layer.

In some possible embodiments, before the producing the device layer on the substrate, the method further includes:

thinning the substrate.

In some possible embodiments, the thinning the substrate includes:

thinning the substrate to 10 um or less.

In a fourth aspect, provided is a security chip, including the security chip produced in the method in the third aspect and any possible embodiment of the third aspect.

DESCRIPTION OF EMBODIMENTS

Technical solutions in embodiments of the present disclosure will be described hereinafter with reference to accompanying drawings.

The embodiments of the present disclosure are suitable for manufacturing various chips, especially a special chip or a security chip that can execute complex encryption and decryption algorithms. For example, the security chip may be a biochip (such as a fingerprint sensor chip), a chip provided with a circuit (such as a processor), various types of chips in the Internet of Things field, and so on. For example, the security chip may include an element such as a transistor, a resistor, a capacitor, and an inductor, and a wiring device or component. For example, the security chip may be a miniature electronic device or component carrying an integrated circuit. This is not specifically limited by the present disclosure. In addition, the technical solutions in the embodiments of the present disclosure may be applied to various electronic devices, for example, portable or mobile computing devices such as a smart phone, a notebook computer, a tablet computer and a game device, and other electronic devices such as an electronic database, an automobile and an automated teller machine (ATM), which is not limited in the embodiments of the present disclosure.

It should be noted that, for convenience of description, in the embodiments of the present disclosure, like reference numerals represent like components, and detailed description of the like components is omitted in different embodiments for the sake of brevity. It should be understood that dimensions such as thicknesses, lengths and widths of various components in embodiments of the present disclosure shown in the drawings, as well as dimensions such as the overall thickness, length and width of an integrated device are merely illustrative, and should not constitute any limitation to the present disclosure.

In addition, for convenience of understanding, in embodiments shown below, for structures shown in different embodiments, like structures are denoted by like reference numerals, and detailed description of the same structures is omitted for brevity.

Figure 1:
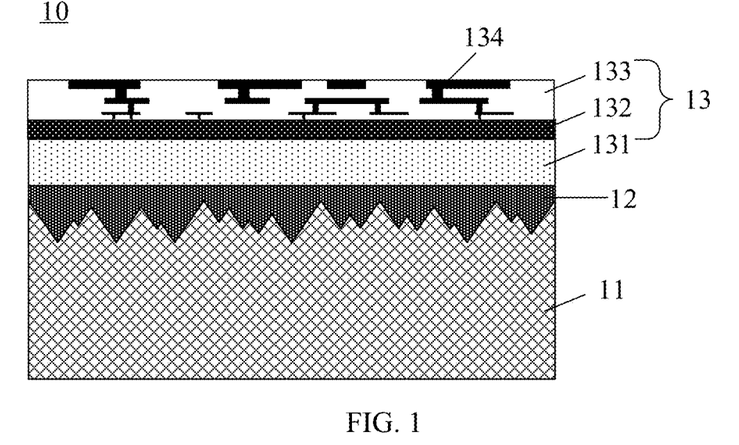
FIG. 1 is a schematic structural diagram of a security chip according to an embodiment of the present disclosure.

FIG. 1 is a schematic structural diagram of a security chip according to an embodiment of the present disclosure.

Referring to FIG. 1, a security chip 10 includes a first medium layer 11, a second medium layer 12 and a semiconductor chip 13. The second medium layer 12 is disposed on the first medium layer 11, and the semiconductor chip 13 is disposed on the second medium layer 12. Further, the semiconductor chip 13 can be etched and wired on a semiconductor sheet to produce a semiconductor device that can realize a certain function. For example, the semiconductor chip 13 may include a substrate 131, a device layer 132 disposed on the substrate 131, and an interconnection layer 133 disposed on the device layer 132. The interconnection layer 132 may be realized by disposing a metal layer 134 in a medium layer, which is not limited in the present disclosure.

The first medium layer 11 may be an optically denser medium relative to the second medium layer 12 (that is, a refractive index of the first medium layer 11 is greater than a refractive index of the second medium layer 12). In other words, the second medium layer 12 may be an optically thinner medium relative to the first medium layer 11 (that is, the refractive index of the second medium layer 12 is smaller than the refractive index of the first medium layer 11). Further, a roughness of an upper surface of the first medium layer 11 is greater than or equal to a preset threshold, so that light entering the second medium layer 12 vertically from the first medium layer 11 is able to be totally reflected and/or scattered. For example, the preset threshold may be 20 nm.

In order to facilitate the understanding of the solution of the present disclosure, a total reflection phenomenon is briefly introduced below.

Total reflection, also known as total internal reflection, refers to a phenomenon that when light is transmitted from an optically denser medium (that is, a refractive index of light in this medium is great) to an interface of an optically thinner medium (that is, a refractive index of light in this medium is small), it is all reflected back into the original medium.

Figure 2:
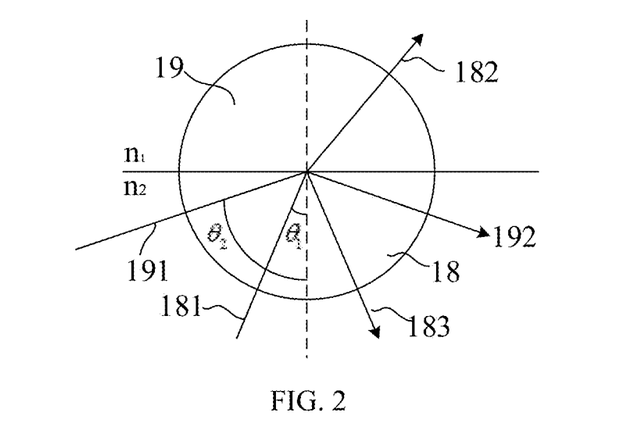
FIG. 2 is a schematic principle diagram of light propagating in two media according to an embodiment of the present disclosure.

FIG. 2 is a schematic principle diagram of light propagating in two media according to an embodiment of the present disclosure.

Referring to FIG. 2, light enters from an optically denser medium 18 with a higher refractive index $n_1$ into an optically thinner medium 19 with a lower refractive index $n_2$. When an angle of incidence $\theta_1$ of first light 181 is smaller than a critical angle $\theta_c$, the light 181 is refracted toward the optically thinner medium 19 to generate refracted light 182, while reflected toward the optically denser medium 18 to generate reflected light 183; and when an angle of incidence $\theta_2$ of second light 191 is greater than or equal to the critical angle $\theta_c$, light refracted toward the optically thinner medium 19 disappears, and the second light 191 is only reflected toward the optically denser medium 18 to form reflected light 192, that is, the second light 191 is totally reflected, which is also called total internal reflection. The critical angle $\theta_c$ can also be considered as an angle of incidence when an angle of refraction is 90 degrees.

The critical angle $\theta_c$ can be determined by the following formula:

$$\theta_c = \arcsin\frac{n_2}{n_1}$$

where $\theta_c$ represents the critical angle, $n_1$ represents the refractive index of the optically denser medium 18, $n_2$ represents the refractive index of the optically thinner medium 19, and $n_1$ is greater than $n_2$.

It should be noted that the optically denser medium 18 and the optically thinner medium 19 are relatively speaking. When two substances are compared, one with a smaller refractive index is an optically thinner medium, and one with a greater refractive index is an optically denser medium. For example, if a refractive index of air is about 1, a refractive index of water is about 1.33, and a refractive index of glass is about 1.5, water is an optically denser medium relative to air, and water is an optically thinner medium relative to glass. The present disclosure does not limit the specific materials of the first medium layer 11 and the second medium layer 12, as long as it is ensured that the refractive index of the first medium layer 11 is greater than the refractive index of the second medium layer 12.

Based on the above analysis, it can be seen that regarding vertical light incident in a vertical direction with respect to a lower surface of the first medium layer 11, when the roughness of the upper surface of the first medium layer 11 is greater than or equal to the preset threshold, the vertical light can reach an interface between the first medium layer 11 and the second medium layer 12, which increases its angle of incidence so that the angle of incidence is greater than a critical angle to meet conditions for total reflection; and the vertical light entering the first medium layer 11 through total reflection can effectively reduce intensity of refracted light entering the second medium layer 12, so that most of the light cannot reach a logic or storage area on the front of the security chip, thereby achieving the purpose of resisting a laser attack.

Regarding oblique light incident in an oblique direction with respect to the lower surface of the first medium layer 11, when the roughness of the upper surface of the first medium layer 11 is greater than or equal to the preset threshold, light receiving area of the second medium layer 12 for the oblique light can be reduced, which further reduces the amount of refracted light entering the second medium layer 12, thereby achieving the purpose of resisting a laser attack. In addition, compared with a propagation path of the vertical light in the first medium layer 11, a propagation path of the oblique light in the first medium layer 11 is longer, which further increases the loss in the process that the oblique light reaches the first medium layer 11 and the second medium layer 12, and further reduces intensity of the light entering the second medium layer 12 and ensures safety of the semiconductor chip 13.

In addition, regardless of whether the interface between the first medium layer 11 and the second medium layer 12 is perpendicular or not perpendicular to incident light, the upper surface of the first medium layer 11 whose roughness is greater than the preset threshold can scatter the light, so that a laser cannot be concentrated to a specific area, thereby further reducing intensity of refracted light entering the second medium layer 12.

In summary, light incident from the lower surface of the first medium layer 11 is able to be totally reflected or scattered by the upper surface of the first medium layer 11, thereby reducing intensity of light reaching the logic or storage area on the front of the security chip, thereby achieving the purpose of resisting a laser attack.

In addition, by producing the semiconductor chip on a substrate formed by the first medium layer 11 and the second medium layer 12, not only a laser attack can be ensured to be prevented in a case that an additional chip area is not occupied, but also a process flow is relatively simple and does not affect a processing method of the chip, which is convenient for mass production.

Of course, the roughness of the upper surface of the first medium layer 11 may also be smaller than the preset threshold. In this case, for example, regarding oblique light incident in an oblique direction with respect to the lower surface of the first medium layer 11, it can be ensured that its angle of incidence is greater than the critical angle to meet conditions for total reflection; and the oblique light entering the first medium layer 11 through total reflection can effectively reduce intensity of refracted light entering the second medium layer 12, so that most of the light cannot reach the logic or storage area on the front of the security chip, thereby achieving the purpose of resisting a laser attack.

As an example, the interface between the first medium layer 11 and the second medium layer 12 may be provided with a spike-like structure or a hole-like structure. The spike-like structure is beneficial to increasing an angle of incidence of incident light perpendicular to the first medium layer 11, thereby causing the incident light to be totally reflected, and the hole-like structure is beneficial to scattering incident light. For example, the spike-like structure may be a structure shown in FIG. 1. That is, the spike-like structure may be formed by an irregularly-sized pyramidal protrusion or inverted pyramidal pit. Optionally, an oblique surface of the pyramidal protrusion and a bottom surface of the first medium layer form an angle of 54.7 degrees. Of course, the spike-like structure may also be formed by a regular pyramidal protrusion or inverted pyramidal pit, and the angle between the oblique surface of the pyramidal protrusion and the first medium layer 11 may also be other numerical value, such as 60 degrees, which is not specifically limited in the present disclosure. The pyramidal protrusion may have a regular or irregular sawtooth structure in cross section.

Figure 3:
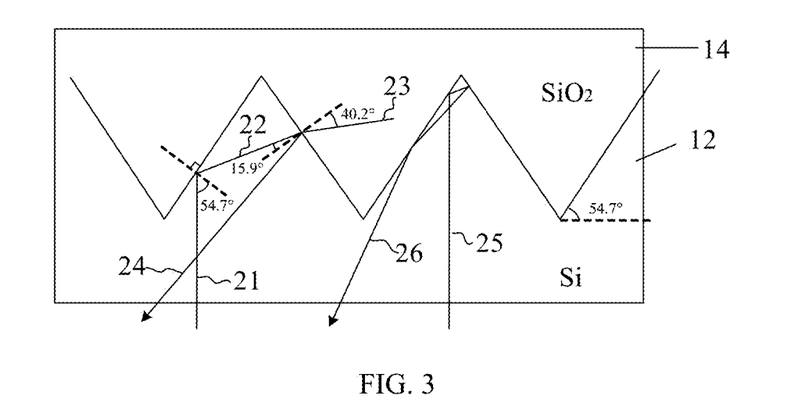
FIG. 3 is a schematic principle diagram of light transmitting in the security chip shown in FIG. 1.

FIG. 3 is a schematic principle diagram of light transmitting in the security chip shown in FIG. 1.

In the following, with reference to FIG. 3, a technical principle of the present disclosure will be described with an example that a material of the first medium layer 11 is silicon (Si), and a material of the second medium layer 12 is silicon dioxide ($SiO_2$).

Referring to FIG. 3, the material of the first medium layer 11 is Si, and the material of the second medium layer 12 is silicon dioxide ($SiO_2$). In an infrared waveband, a refractive index of silicon is about 3.42, a refractive index of $SiO_2$ is about 1.45, and a critical angle of total reflection is about 25 degrees. Therefore, when an angle of incidence of light is greater than 25 degrees, total reflection will occur.

By taking incident light 21 as an example, the incident light 21 is transmitted from the first medium layer 11 to the second medium layer 12 in a vertical direction, and an angle of incidence (54.7 degrees) of the incident light 21 is greater than the critical angle of total reflection (25 degrees), and therefore, the incident light 21 is totally reflected at an $Si/SiO_2$ interface, that is, only reflected light 22 is generated. Then, since an angle of incidence (15.9 degrees) of the reflected light 22 is smaller than the critical angle of total reflection, multiple reflections and refractions occur, that is, reflected light 24 and refracted light 23 are generated. It can be seen that only a very small amount of light (that is, the light 23) can enter the second medium layer 12 from the first medium layer 11. Similarly, most of incident light 25 will be reflected back in the form of reflected light 26, which effectively reduces intensity of light entering the second medium layer 12 and achieves the purpose of resisting a laser attack.

In addition, when incident light is not perpendicular to the $Si/SiO_2$ interface, on the one hand, a propagation path of the light in the first medium layer 11 is extended, and on the other hand, the light is blocked through a pyramidal protrusion at the $Si/SiO_2$ interface, which can reduce light-receiving area of the second medium layer, and further can reduce intensity of refracted light entering the second medium layer 12, that is, reducing intensity of light reaching a logic or storage area on the front of a security chip, thereby preventing a laser attack.

In summary, by forming the angled $Si/SiO_2$ interface, no matter whether incident light is perpendicular or not perpendicular to the $Si/SiO_2$ interface, when the light is transmitted from the back of the security chip to the front of the security chip, intensity of light reaching the logic or storage area on the front of the security chip can be reduced, thereby achieving the purpose of resisting a laser attack.

Figure 4:
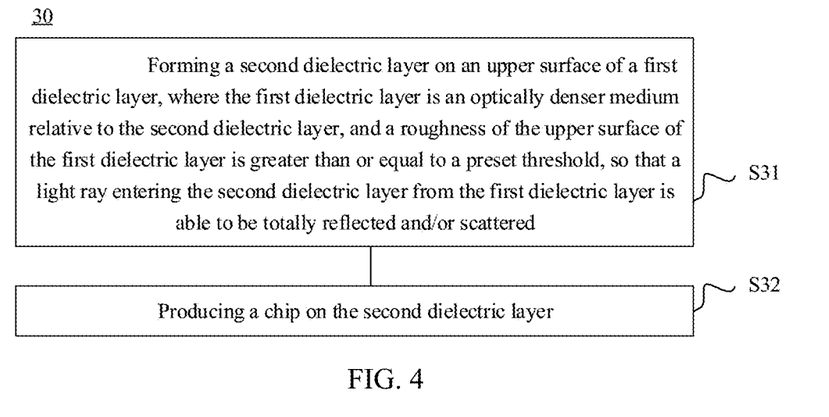
FIG. 4 is a schematic flow chart of a method for producing a security chip according to an embodiment of the present disclosure.

FIG. 4 is a schematic flow chart of a method for producing a security chip according to an embodiment of the present disclosure.

Referring to FIG. 4, a method 30 for producing a security chip may include:

S31, forming a second medium layer on an upper surface of a first medium layer, where the first medium layer is an optically denser medium relative to the second medium layer, and a roughness of the upper surface of the first medium layer is greater than or equal to a preset threshold, so that light entering the second medium layer from the first medium layer is able to be totally reflected and/or scattered; and S32, producing a semiconductor chip on the second medium layer.

Before the S31, the upper surface of the first medium layer whose roughness is greater than or equal to the preset threshold may be formed, so that light is totally reflected and/or scattered when the light enters the second medium layer from the first medium layer. For example, the preset threshold is 20 nm. That is, the second medium layer is formed on the upper surface of the first medium layer whose roughness is greater than or equal to the preset threshold. For example, the upper surface of the first medium layer that is provided with a spike-like structure or a hole-like structure is formed first, and then the second medium layer is formed on the upper surface of the first medium layer. For example, the spike-like structure may be a structure formed by a pyramidal protrusion or a pyramidal pit. Optionally, an oblique surface of the pyramidal protrusion and a bottom surface of the first medium layer form an angle of 54.7 degrees.

For example, the first medium layer may be placed in a corrosive agent first; and then the corrosive agent is heated to form the upper surface of the first medium layer that is provided with the spike-like structure or the porous structure. The corrosive agent includes but is not limited to: a sodium hydroxide (NaOH) solution, a potassium hydroxide (KOH) solution, a tetraethylammonium hydroxide (TMAH) solution, or a sodium silicate ($Na_2SiO_3$) solution. A concentration of the corrosive agent is greater than or equal to a preset threshold, such as 8 wt %. Specifically, the corrosive agent may be heated to 80° C. or above, and corroded for 25 minutes or above.

In the S31, the second medium layer may be formed on the upper surface of the first medium layer by a deposition process.

The deposition process includes but is not limited to:

a physical vapor deposition (PVD) process and/or a chemical vapor deposition (CVD) process, for example, thermal oxidation, plasma enhanced chemical vapor deposition (PECVD), low pressure chemical vapor deposition (LPCVD), atomic layer deposition (ALD), spin coating or spraying.

Before the S32, a flat upper surface of the second medium layer may be first formed by a planarization process, and then the semiconductor chip is deposited on the upper surface of the second medium layer.

In the S32, a substrate may be first bonded on the second medium layer; then a device layer is produced on the substrate; and finally, an interconnection layer is produced on the device layer. Further, before the device layer is produced on the substrate, the substrate may further be thinned. For example, the substrate is thinned to 10 um or less.

FIGS. 5 to 9 are schematic structural diagrams of phased products in a process of producing a security chip according to an embodiment of the present disclosure. A method for producing a security chip according to an embodiment of the present disclosure will be described below with reference to FIGS. 5 to 9.

Figure 5:
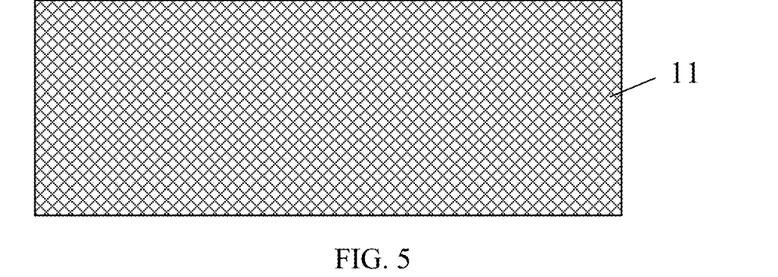
FIGS. 5 to 9 are schematic structural diagrams of phased products in a process of producing a security chip according to an embodiment of the present disclosure.
Figure 6:
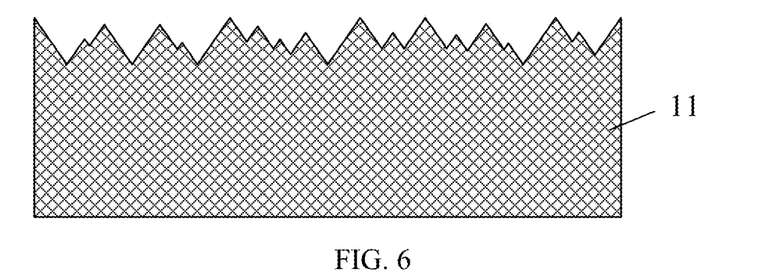

Step 1:

First, a first medium layer 11 as shown in FIG. 5 is selected, for example, a silicon wafer with a crystal orientation of 100 is selected as the first medium layer 11. Then, the first medium layer 11 is placed in a NaOH solution with a concentration of 8 wt %, and the NaOH solution is heated to at least 80° C. to corrode the first medium layer 11 for at least 25 minutes. After corrosion, a structure as shown in FIG. 6 is formed on an upper surface of the first medium layer 11, that is, countless pyramid structures with different sizes are formed on the upper surface of the first medium layer 11.

Figure 7:
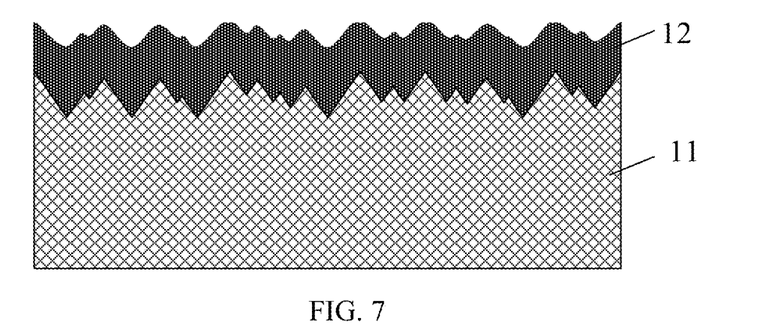

Step 2:

A second medium layer 12 as shown in FIG. 7 may be deposited on the upper surface of the first medium layer 11 by a CVD process. For example, the second medium layer 12 may be a silicon dioxide layer.

Figure 8:
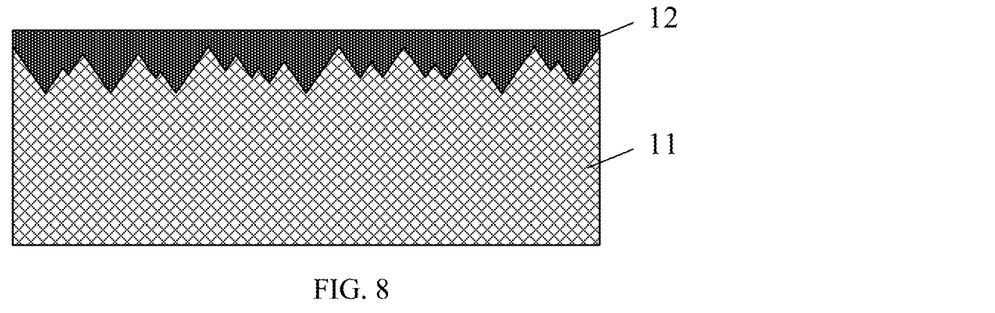

Step 3:

The second medium layer 12 may be polished by a chemical mechanical polishing (CMP) process, and an upper surface of the second medium layer 12 forms a flat plane as shown in FIG. 8.

Figure 9:
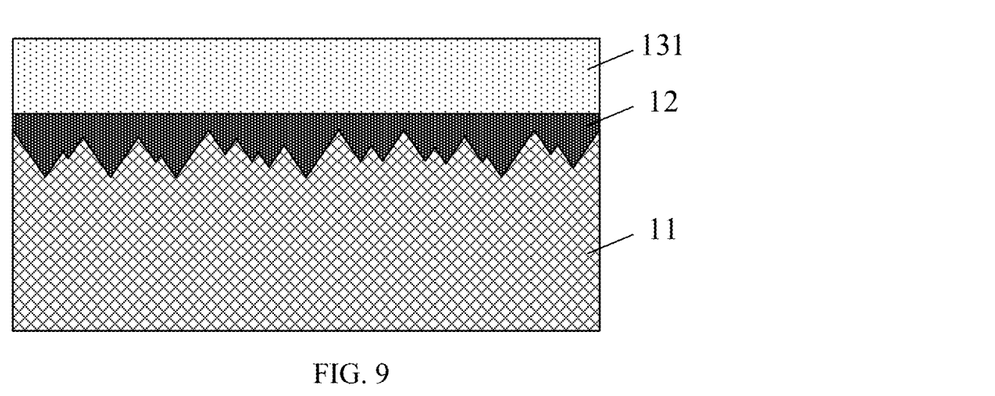

Step 4:

A structure obtained in step 3 may be used as a handle wafer, and another substrate 131 may be used as a device wafer, such as a silicon wafer. Then, a bonding process may be used to permanently bond the substrate 131 and the second medium layer 12 together to form a structure as shown in FIG. 9. The second medium layer 12 is located between the first medium layer 11 and the substrate 131, that is, the second medium layer is located between two wafers.

Further, a thickness of the device wafer may also be thinned to 10 microns by a CMP process.

Step 5:

A device layer 132 may be produced first in the silicon layer with a thickness of 10 microns by a front-end-of-line (FEOL) process, and then an interconnection layer 133 is produced by a back-end-of-line (BEOL) process. The FEOL process includes, but is not limited to, cleaning, growth of a thermal oxidation layer, deposition, photolithography, dry/wet etching, ion implantation, diffusion, or the like, so that a transistor, a capacitor, and other devices are produced on a substrate or on a silicon layer of a silicon on insulator (SOI) wafer. When the BEOL process is used to produce an inter-metal medium layer and a metal layer, devices manufactured by the FEOL process can be connected to form a semiconductor chip with a specific function. It should be understood that the device layer 132 and the interconnection layer 133 may be produced by an existing production process, which is not specifically limited in the present disclosure.

Step 6:

The produced wafer may be thinned from the back, for example, a thickness of the first medium layer 11 may be thinned, and then cut along a dicing path to obtain individual discrete chips.

Figure 10:
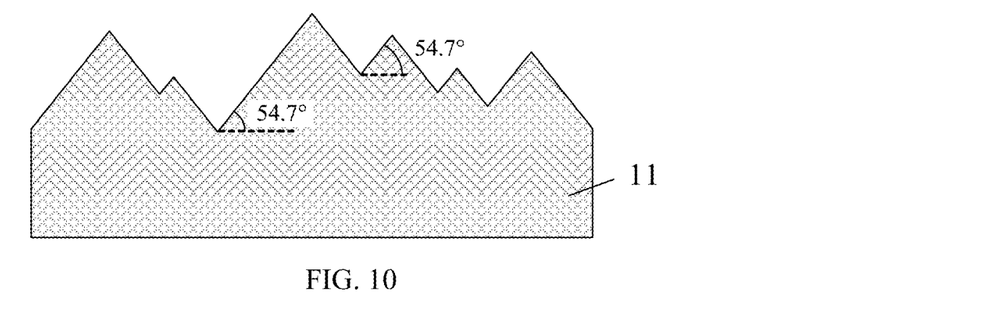
FIGS. 10 to 13 are schematic diagrams of a first medium layer in a security chip according to an embodiment of the present disclosure.
Figure 11:
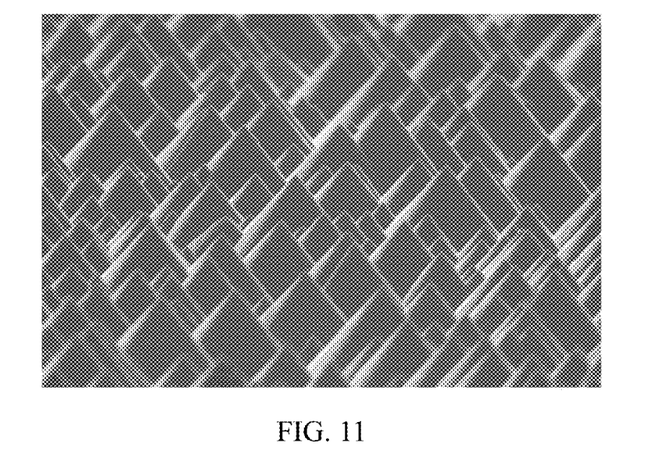

FIGS. 10 and 11 are schematic diagrams of the first medium layer in the security chip as shown in FIG. 1.

Referring to FIGS. 10 and 11, a hot NaOH solution is used to perform anisotropic wet etching on a silicon wafer with a crystal orientation of 100, and a silicon wafer surface composed of a pyramid with a random size can be obtained. In other words, by performing anisotropic wet etching on the silicon wafer with a crystal orientation of 100, a structure formed by a pyramidal protrusion or a pyramidal pit with a random size can be obtained, and an angle between an oblique surface of the pyramidal protrusion and a bottom surface of the first medium layer 11 is 54.7 degrees.

It should be understood that FIGS. 10 and 11 are merely examples of the present disclosure and should not be construed as limitation to the present disclosure.

For example, a KOH solution, a TMAH solution, a $Na_2SiO_3$ solution or a mixed corrosive agent of the above solutions may be used to obtain a similar topography.

Figure 12:
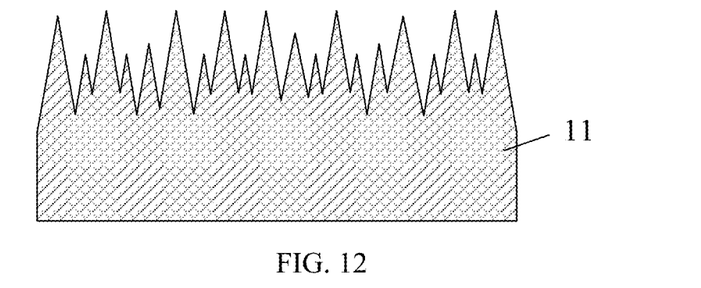
Figure 13:
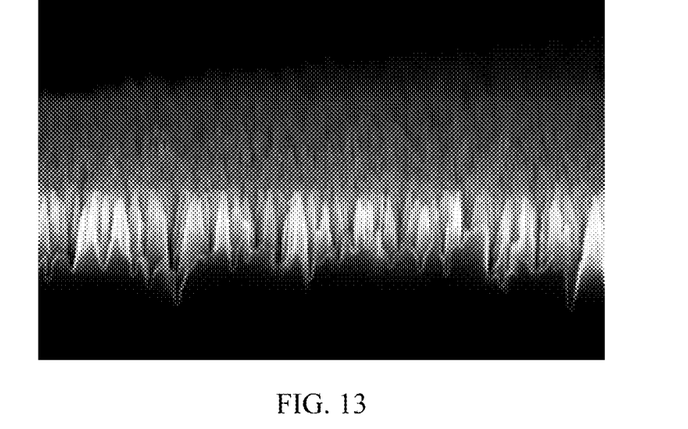

For example, the upper surface of the first medium layer 11 may be provided with a rough surface (for example, the roughness is greater than 20 nm) or a porous surface by at least one of the following processes: a physical mechanical grinding process, a dry etching process, a metal assisted corrosion process, or an electrochemical corrosion process. For example, a spike-like structure, a protrusion structure or a hole-like structure as shown in FIGS. 12 and 13 may be formed on the upper surface of the first medium layer 11, and the rough surface of the first medium layer 11 may be used for reflecting and/or scattering incident light, and preventing or slowing down a laser from penetrating the second medium layer 12, so that most of light cannot reach a logic or storage area on the front of the security chip, thereby achieving the purpose of resisting a laser attack.

The dry etching process may include at least one of the following etching processes: reactive ion etching, plasma etching, ion beam etching, or the like. Preferably, an etching ratio may be changed by changing a mixing ratio of etching gas.

It should be understood that the method embodiment and the product embodiment may correspond to each other, and similar description may refer to the product embodiment. For brevity, details are not described herein.

It should also be understood that, each embodiment of the method 30 for producing the security chip listed above may be performed by robot or numerical control machining. The device software or process for performing the method 30 may perform the foregoing method 30 by executing a computer program code stored in a memory.

The present disclosure further provides a security chip produced according to the above production method.

The present disclosure further provides an electronic device including the security chip 10 described above, or an electronic device including the security chip produced according to the method 30 described above.

It should be noted that, under a premise of no conflict, various embodiments and/or technical features in the various embodiments described in the present disclosure may be combined with each other arbitrarily, and technical solutions obtained after the combination should also fall within the protection scope of the present disclosure.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, various exemplary production methods described in conjunction with the embodiments disclosed herein may be implemented by electronic hardware or a combination of computer software and electronic hardware. Whether these functions are performed by hardware or software depends on specific applications and designed constraint conditions of the technical solutions. Persons skilled in the art may use different methods to implement the described functions for each particular application, but it should not be considered that the implementation goes beyond the scope of the present disclosure.

In several embodiments provided in the present disclosure, it should be understood that the disclosed integrated device, component in the integrated device, and method for producing the integrated device may be implemented in other manners. For example, the integrated device embodiments described above are only exemplary. For example, division of the layers is only a logical function division, and there may be other division methods in actual implementation.

Described above are the specific embodiments of the present disclosure only, but the protection scope of the present disclosure is not limited thereto, those skilled who are familiar with the art could readily think of variations or substitutions within the technical scope disclosed by the present disclosure, and these variations or substitutions shall fall within the protection scope of the present disclosure. Therefore, the protection scope of claims should prevail over the protection scope of the present disclosure.

What is claimed is:

1. A security chip, comprising:
   a first medium layer;
   a second medium layer disposed on the first medium layer, wherein the first medium layer is an optically denser medium relative to the second medium layer, and a roughness of an upper surface of the first medium layer is greater than or equal to a preset threshold, so that light entering the second medium layer from the first medium layer is able to be totally reflected and scattered; and
   a semiconductor chip disposed on the second medium layer,
   a material of the first medium layer is silicon, and a material of the second medium layer is silicon dioxide.

2. The security chip according to claim 1, wherein the preset threshold is 20 nm.

3. The security chip according to claim 2, wherein the upper surface of the first medium layer is provided with a spike-like structure or a hole-like structure.

4. The security chip according to claim 3, wherein the spike-like structure is formed by an irregularly-sized pyramidal protrusion or inverted pyramidal pit.

5. The security chip according to claim 4, wherein an oblique surface of the pyramidal protrusion and a bottom surface of the first medium layer form an angle of 54.7 degrees.

6. The security chip according to claim 1, wherein the semiconductor chip comprises:
   a substrate disposed on the second medium layer;
   a device layer disposed on an upper surface of the substrate; and
   an interconnection layer disposed on the device layer.

7. A method for producing a security chip, comprising:
   forming a second medium layer on an upper surface of a first medium layer, wherein the first medium layer is an optically denser medium relative to the second medium layer, and a roughness of the upper surface of the first medium layer is greater than or equal to a preset threshold, so that light entering the second medium layer from the first medium layer is able to be totally reflected and/or scattered; and
   producing a semiconductor chip on the second medium layer,
   a material of the first medium layer is silicon, and a material of the second medium layer is silicon dioxide.

8. The method according to claim 7, wherein the preset threshold is 20 nm.

9. The method according to claim 7, wherein before the forming the second medium layer on the upper surface of the first medium layer, the method further comprises:
   forming the upper surface of the first medium layer that is provided with a spike-like structure or a hole-like structure.

10. The method according to claim 9, wherein the spike-like structure is formed by an irregularly-sized pyramidal protrusion or inverted pyramidal pit.

11. The method according to claim 10, wherein an oblique surface of the pyramidal protrusion and a bottom surface of the first medium layer form an angle of 54.7 degrees.

12. The method according to claim 9, wherein the forming the upper surface of the first medium layer that is provided with the spike-like structure or the hole-like structure comprises:
   forming the upper surface of the first medium layer that is provided with the spike-like structure or the hole-like structure by at least one of the following processes:
   a physical mechanical grinding process, a dry etching process, a metal assisted corrosion process, or an electrochemical corrosion process.

13. The method according to claim 9, wherein the forming the upper surface of the first medium layer that is provided with the spike-like structure or the hole-like structure comprises:

placing the first medium layer in a corrosive agent; and heating the corrosive agent to form the upper surface of the first medium layer that is provided with the spike-like structure or the hole-like structure.

14. The method according to claim 13, wherein the corrosive agent comprises at least one of the following:

a sodium hydroxide (NaOH) solution, a potassium hydroxide (KOH) solution, a tetramethylammonium hydroxide (TMAH) solution, or a sodium silicate ($Na_2SiO_3$) solution.

15. The method according to claim 13, wherein the heating the corrosive agent comprises:

heating the corrosive agent to a temperature above 80° C. and performing corrosion for more than 25 minutes.

16. The method according to claim 7, wherein the forming the second medium layer on the upper surface of the first medium layer comprises:

forming the second medium layer on the upper surface of the first medium layer by a deposition process.

17. The method according to claim 7, wherein before the producing the semiconductor chip on the second medium layer, the method further comprises:

forming a flat upper surface of the second medium layer by a planarization process.

18. The method according to claim 7, wherein the producing the semiconductor chip on the second medium layer comprises:

bonding a substrate on the second medium layer;

thinning the substrate to 10 um or less;

producing a device layer on the substrate after thinning the substrate to 10 um or less; and producing an interconnection layer on the device layer.

19. An electronic device, comprising:

a processor; and a security chip connected to the processor, wherein the security chip comprises:

a first medium layer;

a second medium layer disposed on the first medium layer, wherein the first medium layer is an optically denser medium relative to the second medium layer, and a roughness of an upper surface of the first medium layer is greater than or equal to a preset threshold, so that light entering the second medium layer from the first medium layer is able to be totally reflected and/or scattered; and a semiconductor chip disposed on the second medium layer, a material of the first medium layer is silicon, and a material of the second medium layer is silicon dioxide.

* * * * *